(12) United States Patent
Mueller (10) Patent No.: US 6,545,880 B1
(45) Date of Patent: Apr. 8, 2003

(54) CRYOGENIC POWER DISTRIBUTION SYSTEM FOR LARGE STRUCTURE

(76) Inventor: Otward M. Mueller, 96 Sweet Rd., Ballston Lake, NY (US) 12019

( * ) Notice: Subject to any disclaimer, the term of this patent is extended or adjusted under 35 U.S.C. 154(b) by 0 days.

(21) Appl. No.: 09/593,084

(22) Filed: Jun. 13, 2000

Related U.S. Application Data (60) Provisional application No. 60/140,939, filed on Jun. 28, 1999.

(51) Int. Cl.[7] .................................................. H02M 1/00
(52) U.S. Cl. .............................. 363/14; 174/43; 174/47; 307/11; 307/13
(58) Field of Search .......................... 363/14; 323/360; 307/42, 82, 11–13, 18, 29, 31, 147, 155, 156, 157; 361/19, 699, 700; 174/15.1, 15.4–15.6, 47, 43, 68.2, 252, 125; 257/716; 505/884, 885, 869, 856, 867, 909

(56) References Cited

U.S. PATENT DOCUMENTS

| | | | | |
|---|---|---|---|---|
| 3,162,716 A | * | 12/1964 | Silver | 174/15 |
| 4,992,623 A | * | 2/1991 | Briley et al. | 174/15.4 |
| 5,319,154 A | * | 6/1994 | Kermarrec | 174/15.5 |
| 6,034,324 A | * | 3/2000 | Dixon et al. | 174/15.4 |
| 6,049,036 A | * | 4/2000 | Metra | 174/15.5 |
| 6,097,181 A | * | 8/2000 | Russo | 323/360 |
| 6,112,531 A | * | 9/2000 | Yamaguchi | 62/51.1 |

OTHER PUBLICATIONS

O.M.Mueller, E.K.Mueller: Cryogenic Power/Energy Distribution System. Paper CPC—1, CEC–ICMC Conderence, Jul. 12–16, 1999, Montreal.

* cited by examiner

*Primary Examiner*—Michael Sherry
*Assistant Examiner*—Gary L. Laxton
(74) *Attorney, Agent, or Firm*—Leonard Cooper (57) ABSTRACT

Energy distribution and conversion system suitable for high-rise structures, large building complexes, factories, ships, airplanes, city blocks, etc., based on: High-Temperature Superconductors (HTS) and Cryogenic Power and Energy Conversion (CPEC) using Low-Temperature Operated Semiconductor Devices (LOTOS). Energy from an AC source is converted to DC by LOTOS, distributed as DC, and reconverted at low temperatures to AC at levels and fequencies to satisfy individual end-users of energy. The DC energy is distributed via a plurality of super-conductive leads that are submerged in cryogenic liquid. Substantial savings in energy, cost, size, weight are produced. Additionally, load shedding, power quality, and fire protection are provided. The new system supports air conditioning/cooling systems. Expensive floor space is saved; electrical energy savings of 5–10% are achieved.

19 Claims, 10 Drawing Sheets

APT 10026JN - 1000 V, 33 A, 0.26Ω,

FIG.1

APT 10053 LNR

Full-Bridge Circuit Using 2 Opposed Current (OC) Half-Bridges

CRYOGENIC POWER DISTRIBUTION SYSTEM FOR LARGE STRUCTURE

CROSS-REFERENCES TO RELATED APPLICATIONS

The benefit of Provisional Patent Application 60/140,939 filed Jun. 28, 1999 is claimed.

A patent application Ser. No. 09/593,196 has been filed Jun. 6, 2000 entitled "Active and Passive Components for Efficient Power Conversion". This invention could be applied in the system disclosed here.

BACKGROUND OF THE INVENTION

This invention pertains to the field of electrical power and energy distribution and conversion in large structures such as high-rise buildings, office complexes, factories, ships, large airplanes, etc. providing a higher efficiency than the existing system thus saving expensive energy.

It is believed that "related background art" does not exist. To the best of the inventors knowledge nobody has described or built an energy/power distribution system based on the integration. Background art in itself is presented by the existing energy/power distribution system based on 480 VAC/120 VAC distribution copper/iron-steel transformers and corresponding copper or aluminum power lines and cables.

Thirty years ago, the equivalent of today's desktop computer filled an entire office room, and yet had only a fraction of its computing power. This tremendous reduction in size, weight, energy consumption, and especially cost has not yet occurred in the field of power electronics, energy distribution, power conversion and control. The reason for this is that the silicon technology that led the computer industry to revolutionize the world has not yet been seriously applied to the copper-and-iron realm of power engineering. However, this is now a possibility through the application of two new technologies: Cryogenic Power Conversion (CPC) using Low-Temperature Operated Semiconductor Devices (LOTOS) and High-Temperature Superconductors (HTS). The basic research for CPC has been done already and awaits implementation.

Figure 1:
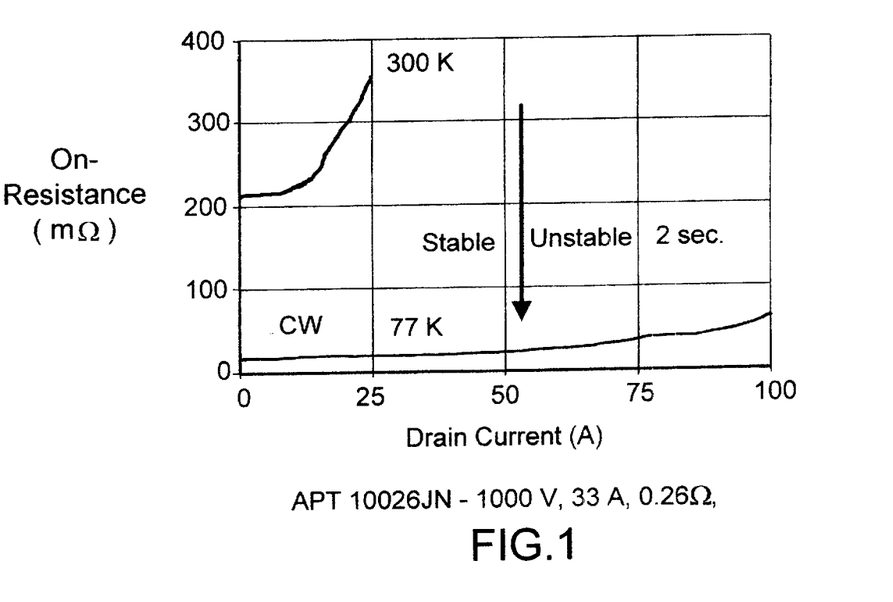
FIG. 1 shows how the conduction loss producing on-resistance of a 1000 V, 33 A power Non-FREDFET MOSFET (Metal-oxide silicon field-effect transistor) APT10026JN is reduced by cryo-cooling down to 77 K by simple immersion into liquid nitrogen (LN2). At low currents the 300K/77 K improvement factor is about 15. This factor increases drastically at higher drain currents. Up to a current of 55 A the measured on-state voltage is stable in continuous operation. This test shows how one can get out from a MOSFET chip many times more current at 77 K than at 300K(1, 2).

The concept of Cryogenic Power Conversion is based on the fact that the conduction losses of power MOSFET switches (1) and the switching losses of IGBTs, MTOs, Thyristors, GTOs, etc. (2) are reduced by cooling the devices to the temperature of liquid nitrogen (77K). The first statement is confirmed by the on-resistance measurements of FIG. 1 for the MOSFET APT10026JN (1000 V, 33 A, 0.26 $\Omega$). The area between the 300 K and 77 K curves represent the Cryo-Gain which is even larger taking into account the higher junction temperatures (400–425 K) in actual operation.

Figure 2:
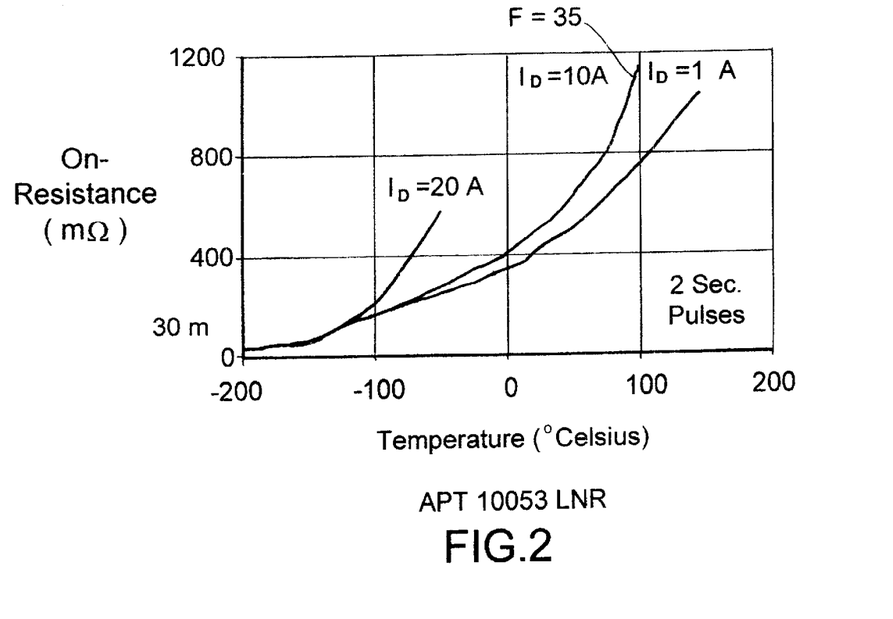
FIG. 2 presents the measured temperature dependence of the on-resistance responsible for conduction losses (in an inverter circuit) at 3 current levels (1 A, 10 A, 20 A) for the transistor APT10053 LNR in a TO 264 plastic package. For a junction temperature of 375 K (100° C.) the improvement factor is F=35. The physical basis for the present invention is this on-resistance reduction by cryo-cooling enabling electronic power conversion circuits with very high efficiency larger than 99.5%.

FIG. 2 shows the typical temperature dependence of the same conduction-loss producing parameter. The improvement factor for the on-resistance reduction between 375 K and 77 K is F=35, certainly an impressive number.

Figure 3:
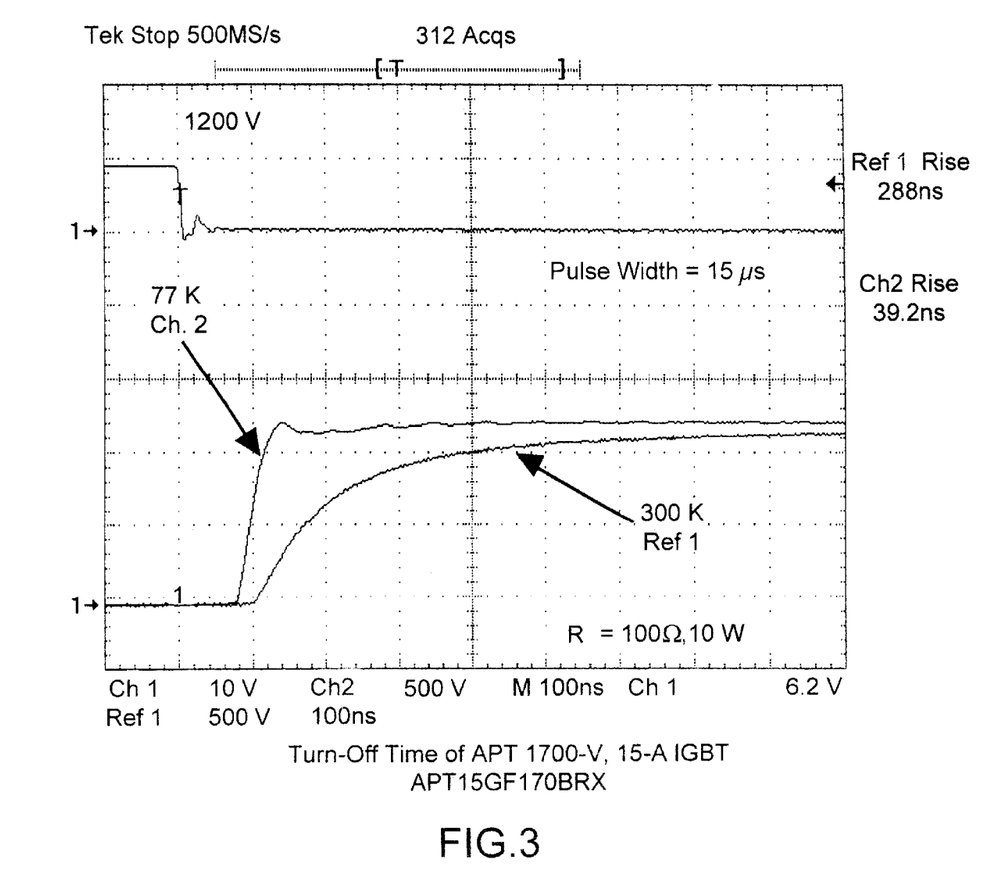
FIG. 3 shows how cryo-cooling reduces the turn-off time and therefore the switching losses of a high-voltage (1700 V, 15 A) IGBT APT15GF1700BRX from 288 to 39 ns. This is another important property obtained by cryo-cooling in order to increase the efficiency.

The physics behind this effect is the drastic increase at low temperatures of the majority carrier electron mobility in the drain-drift region of a high-voltage n-channel power MOSFET. MOSFETs are the fastest switching power devices available (1). Even further improvements, i.e. further reductions in on-resistance, are possible using the new Cool-MOS power devices developed by Siemens (3–5) and recently also by International Rectifier Corporation. Cryo-MOSFETs are best for applications below 1000 V. In minority carrier devices such as IGBTs, IGCTs, IEGTs, MTOs, MCTs, etc. for the higher voltage range (1 kV–6 kV) (6) charge storage limits the switching speed. These charges are proportional to the minority carrier lifetime which in turn is drastically reduced by cryo-cooling thus reducing switching times, and herewith also the switching losses considerably. FIG. 3 shows how the resistive (100 $\Omega$ load) turn-off time of a 1700 V IGBT is reduced from 288 ns at 300 K to 39 ns at 77 K when operated at 1200 V.

Figure 4:
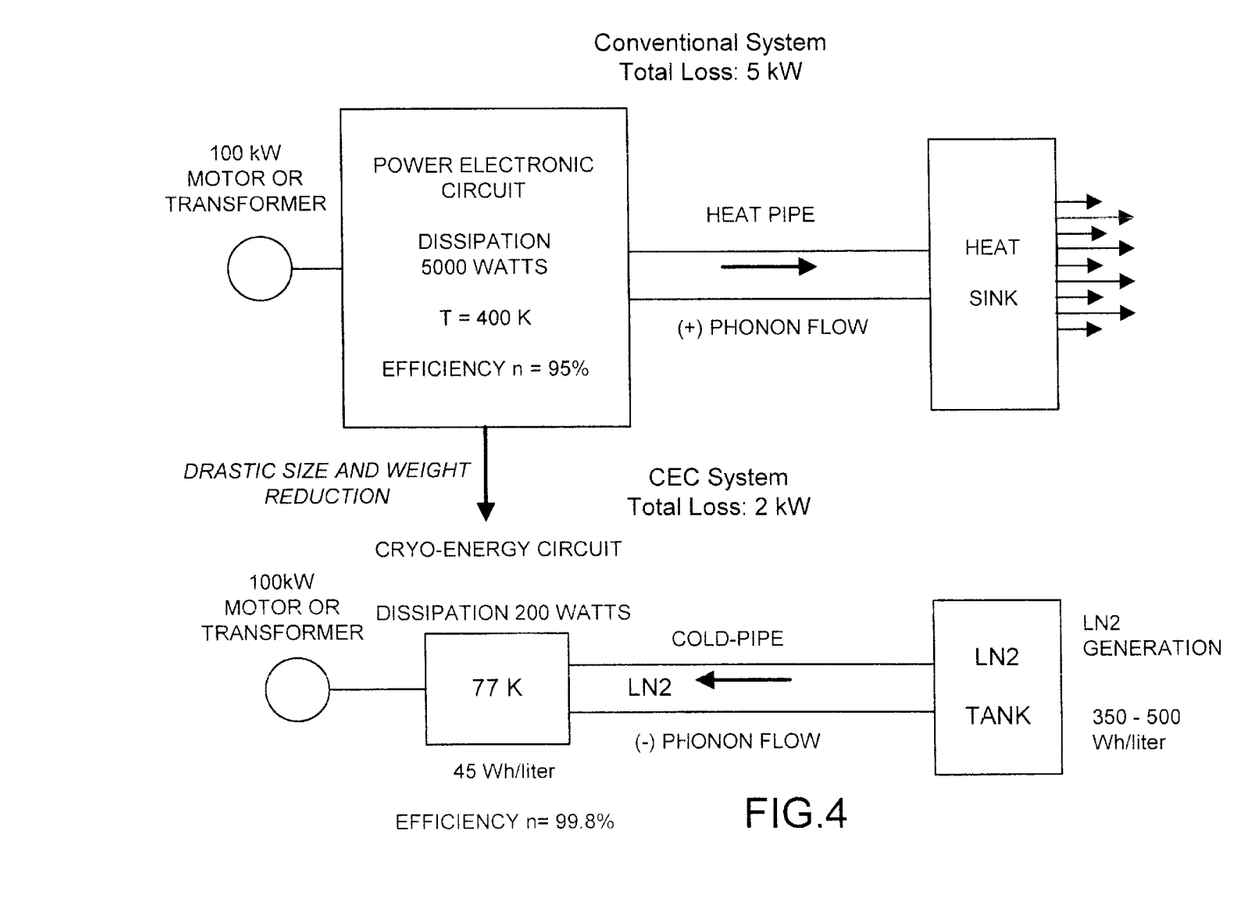

FIG. 4 shows the concept of Cryogenic Power Conversion. The power dissipation of a high power circuit is reduced at the source by cryo-cooling thus permitting a drastic size, weight and cost reduction by eliminating big heatsinks, etc.

The U.S. Department of Energy (DOE) is already funding several efforts to develop high-temperature superconducting cables. An added benefit of the proposed system is that only relatively short cable lengths are required, and these do not have to be designed for high-voltage (>100 kV) applications. Thus, the HTS industry finds a market for immediate implementation, and the entire system can be realized in a period of a few years for any new high-rise building or other large structure to be constructed. One can assume that sooner or later, such lossless cables will be available for applications in Cryogenic Energy Distribution. HTS cables will solve the key problem of CPC and the Cryogenic Energy Distribution System (CEDS), the cryo-cooling for the distributed cryo-power electronics by providing a cryogenic fluid such as liquid nitrogen. Cooling with liquid gases such as LN2 is the only practical solution for HTS cables today. Also, even if it should turn out that HTS cables are too expensive (7), the CED system could be implemented using high-purity liquid-nitrogen-cooled cooper or aluminum cables, whose DC resistance drops by about the same factor (~x7–8) that applies to LN2 generation (7–10 W/W). This improvement factor is much higher in very pure, but more expensive copper and aluminum cables.

Another advantage of cryogenic operation is the drastic reduction of the thermal conductivity of silicon and the usual substrate materials such as beryllium-oxide, etc.

In summary, it is believed that the prior art does not interfere with this disclosure. None of the referenced patents teaches the intricate combination of high-temperature superconducting cables with high-efficiency cryo-cooled silicon power electronics in a large-scale system. In addition, prior art represented by conventional transformers is totally different from the new technology proposed in this patent application. The conventional electrical power distribution system is basically about hundred years old, is not very efficient and did not yet profit from the many new technologies such as high-temperature superconductors and the whole semiconductor technology with its tremendous potential for size, weight and cost reduction at increased reliability.

SUMMARY OF THE INVENTION

The object of this invention is to provide an electrical power/energy distribution system which is more efficient than the existing one by using two new technologies thus saving a considerable amount of energy if implemented on a large scale in big cities. It will also reduce global warming.

The existing electric distribution infrastructure has remained unchanged for almost a century. A key component of this system is the so-called "distribution transformer" converting 480 VAC, 60 Hz into 120/240 VAC, 60 Hz. This transformer has a relatively low efficiency of ~95% and has been called by experts the "weak link" in the US energy distribution system. Accordingly, this invention introduces two new technologies to change this situation providing the benefits of higher efficiency, reduced energy consumption, and in addition power load shedding, voltage regulation, improved power quality, power factor correction and control. Additional benefits are possible and will be discussed.

Figure 5:
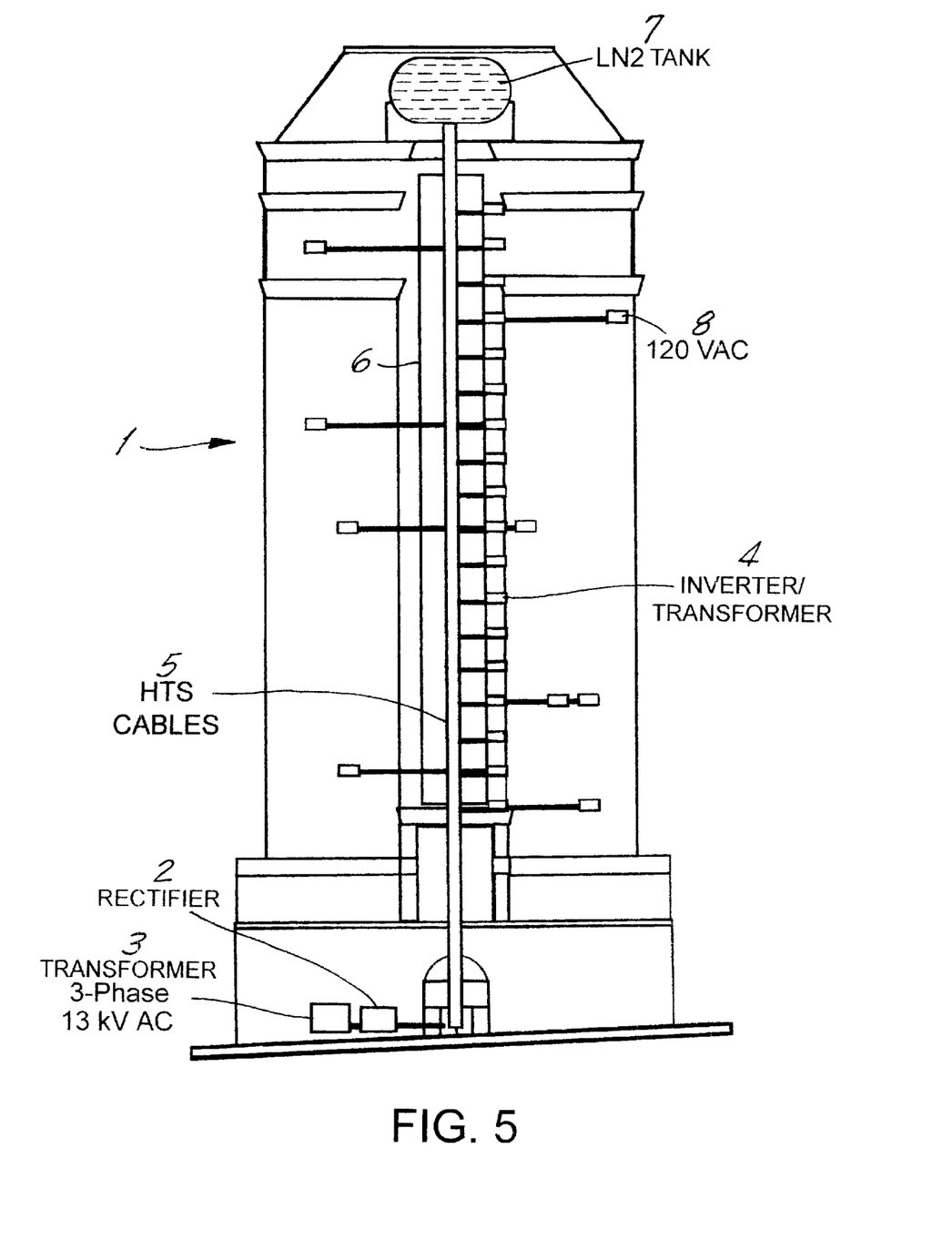

The new Cryogenic Energy and Power Distribution (CED) system according to this invention is shown in FIG. 5 based on the application of the two new technologies of High-Temperature Superconductivity (HTS) and Cryogenic Power Electronics (CPE). The CED system combines the following concepts, features and configurations:

- A central high-temperature superconducting DC cable (650 VDC or higher) cooled by liquid nitrogen (LN2, 77 K) is installed and extends from the top floor to the basement of the high-rise (or any other) building through its center (FIG. 5).
- HTS Cable Power Distribution: High-Temperature Superconducting (HTS) DC cables supply electrical power and the cooling medium—liquid nitrogen—to the main power loads. The use of direct current permits a doubling of the transmitted energy per wire cross-section and the elimination of AC losses in the HTS cables, thereby allowing for reduced cable weight. The DC voltage is 650 VDC (480 VAC rectified), 2×325 VDC or any other suitable voltage (1.2 kV, 2.4 kV).
- Cryogenic Power Conversion (CPC): The conventional heavy and bulky copper/iron core transformers (for example 460 VAC/120 VAC, 75 kVA: 500 pound, 1–2 square meter footprint) are replaced by ultra-small, lightweight DC/AC solid-state inverters or DC/DC converters made with cryo-cooled power MOSFETs or other suitable semiconductor power devices. Their size and weight may be in the order of magnitude of a few liters or kilograms respectively. These cryo-silicon transformers (650 VDC to 120/240 VAC) may be integrated directly with the HTS cable structure due to their small size, exhibit an electrical efficiency of >99.8% (without cooling penalty), and they save a lot of valuable, expensive rental space.
- With some minor modifications, the cryo-transformer/inverter circuits can also be used as motor drives and adjustable speed drives (ASDs) in factories requiring many motors. They have a high overdrive capability: A few seconds of 300 kVA power can be obtained from a 100 kVA inverter.
- Cryogenic Power Electronics (CPE) provides drastically increased reliability and lifetime. In addition, it permits improved power quality, power factor correction, voltage regulation, HTS current limiting, load shedding and so on.
- A capacitive energy storage system based on cryo-cooled ceramic capacitors can easily be integrated into the CED system providing additional power quality.
- The thermal insulation of the circuit dewar and the HTS cables can be implemented using polymer thin-film multi-layer isolation (MLI), which can also be used to increase the capacity of a capacitive energy storage system (See U.S. application Ser. No. 09/593,196). The thermal losses of HTS cables or Cryo-Inverters can be dimensioned in such a way that they add to airconditioning and space cooling in hot areas if desired. In this case the cables can be made at a lower cost.
- The ubiquitous availability of liquid nitrogen in a CED system provides an excellent new means for fire protection and suppression. LN2 does not burn and drives away oxygen, and was therefore used to extinguish the burning oil wells in Kuwait! No more exploding oil transformers generating fires! Evaporated LN2 also does not generate any "water damage". This is one of the many advantages of the present invention.

The proposed CED system can immediately be used for commercial energy and power distribution in all new large buildings, especially high-rise buildings, factories, large-scale offices, ships, etc. The John Hancock building in Boston, for example, has 62 floors and 124 large and bulky cooper-irons distribution transformers requiring a special room for their installation. The implementation of this system also provides the feature of electrical power load shedding of 7–15%, depending on the air-conditioning load (outside temperature), and an electrical energy saving of 5–12% in high-rise city blocks. Additional savings are possible in these high-rise buildings due to the small footprint of the silicon transformer compared to conventional copper/iron transformers. Rental costs range from $200 to $600 per square meter per year. Thus, the rental value of one square meter of space for a 50 year time span is about $10,000 to $30,000. This price is much higher than the cost of a power transformer itself. The cryo-silicon transformer technology can also be applied to motor drives, especially in combination with HTS motors.

Figure 6:
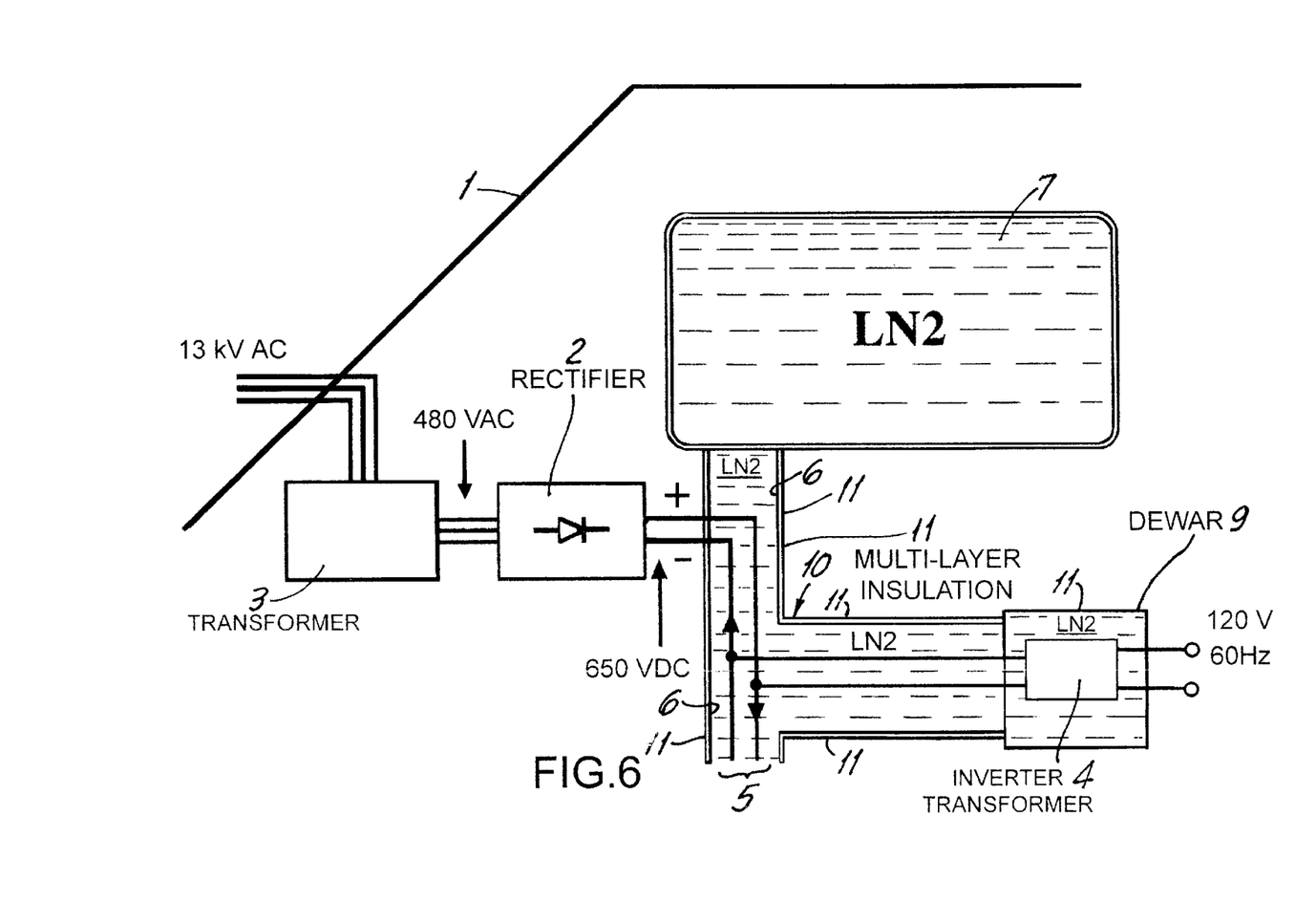
FIG. 6 illustrates a special important part of the CED structure: The T-section connecting the main HTS cable to an inverter supplying electrical power as well as cooling fluid (LN2).

The complete CED system is shown in FIG. 5. The Cryo-Silicon Transformers are cooled by LN2, which is supplied by the HTS cable. It is assumed that each floor requires at least 1–2 inverters/transformers. At the top of the building, a liquid nitrogen tank is placed, as shown in FIG. 6. The HTS cable supplies the electrical power via 650 VDC obtained after rectification of the usual 3-phase, 480 VAC power source delivered by a conventional or HTS transformer from a high voltage source such as 13.8 kV or a fuel cell. Synchronous Cryo-MOSFET rectification can also be used in order to reduce the losses of the rectifier circuitry. Note that DC cables permit the transmission of twice the power for the same voltage ratings and wire cross-sections. Of course, other voltages could be used.

EPRI, the Electrical Power Research Institute, Palo Alto, Calif., issued a technical report in 1995 entitled "Proof of Principle of the Solid-State Transformer" (8). It is believed that, if the silicon transformer is feasible at room temperature as shown by EPRI, it will be even better at cryogenic temperatures (77 K) in combination with HTS cables.

For a 60 Hz silicon transformer the PWM (pulse-width-modulated) switching frequency of a switch-mode inverter can be low (1–10 kHz) so that switching losses are also small or negligible if in addition soft-switching techniques are applied. The efficiency is determined by the ratio of on-state voltage and voltage swing. The APT MOSFET (Advanced Power Technology's Metal-Oxide Silicon Field-Effect Transistor) APT 10050 LVR, rated 1000 V, 21 A, and 0.5 Ω (at 300 K), has an on-resistance of 24.2 mΩ at 77 K, i.e. immersed in liquid nitrogen (LN2). For a supply of 650 V, a current of 10 A, and 2 MOSFETs in series (as is usual in bridge circuits), the on-state voltage to voltage swing ratio is:

$$L = 2 \frac{0.242 \text{ V}}{650 \text{ V}} = 0.00075$$

This corresponds to an efficiency of >99.9%. Assuming a cooling penalty of a factor 10 (10 W/W for LN2 production) and negligible switching losses at theses low frequencies an overall transformer efficiency of >99.0% should be possible.

By paralleling more MOSFETs one can reduce the losses even more down to any desirable level: "Silicon is cheap" and silicon chips are small and have low weight! Considering "Load Shedding" one can use the 99.9% figure, since the cooling LN2 can be produced at a time of low load power consumption.

Figure 7:
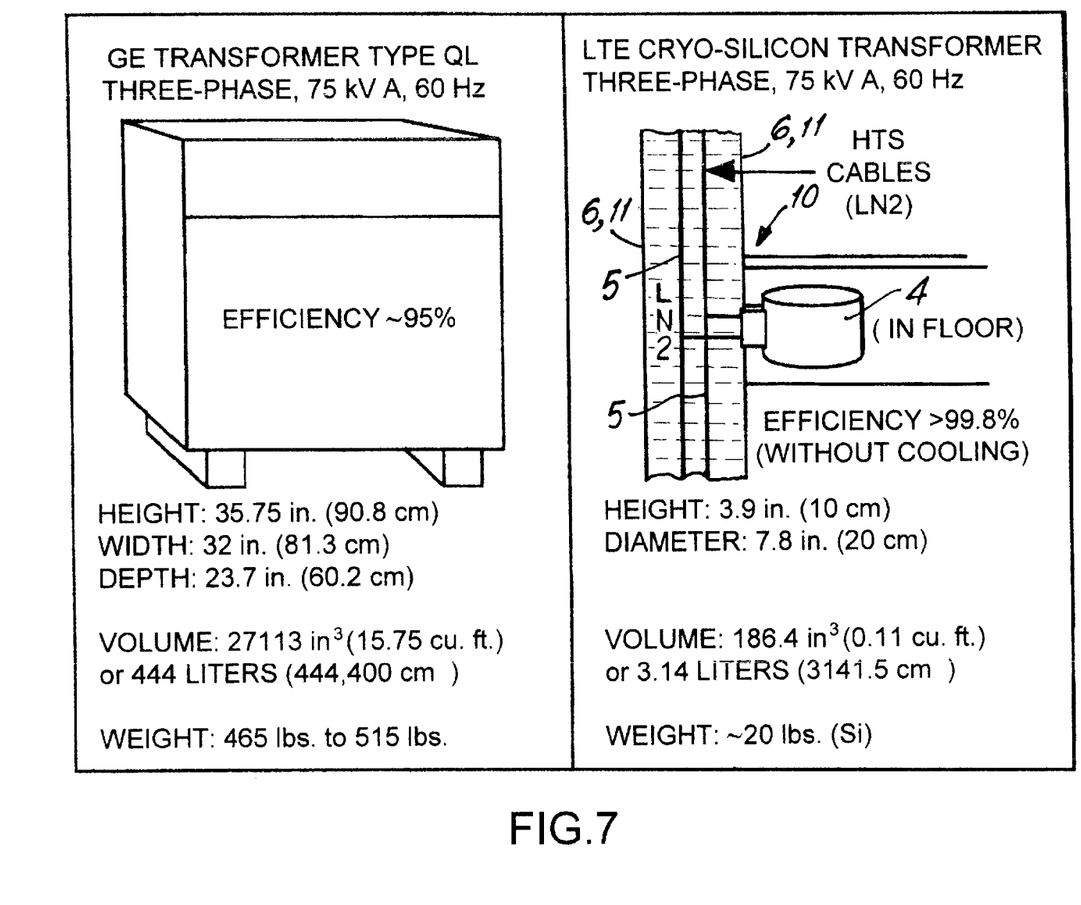
FIG. 7 shows another key feature of this invention: The replacement of conventional large-scale, heavy-weight magnetic copper/iron/steel transformers by small, light-weight solid-state circuits. Some typical numbers are given for size, weight, efficiency etc.

A main advantage of the cryo-silicon transformer is its potential for greatly reduced size, weight and cost. Nothing beats semiconductors as far as cost, weight and size reduction are concerned! A cryo-silicon transformer (FIG. 6) which does not require a large LN2 tank or an expensive cryo-cooler can be quite small. It can be put into a container of a few liters. Where a 75 kVA conventional copper/iron transformer weighs about 500 lbs, a cryo-silicon transformer may have a weight of a few pounds given the availability of a central LN2 source. LN2 is supplied by the HTS cable. It is believed that a cryo-silicon transformer can be made so small that it can be mounted inside the wall or floor of a high-rise building, thus saving much expensive space. FIG. 7 compares a conventional copper/iron transformer with a cryo-silicon transformer inverter.

Figure 9:
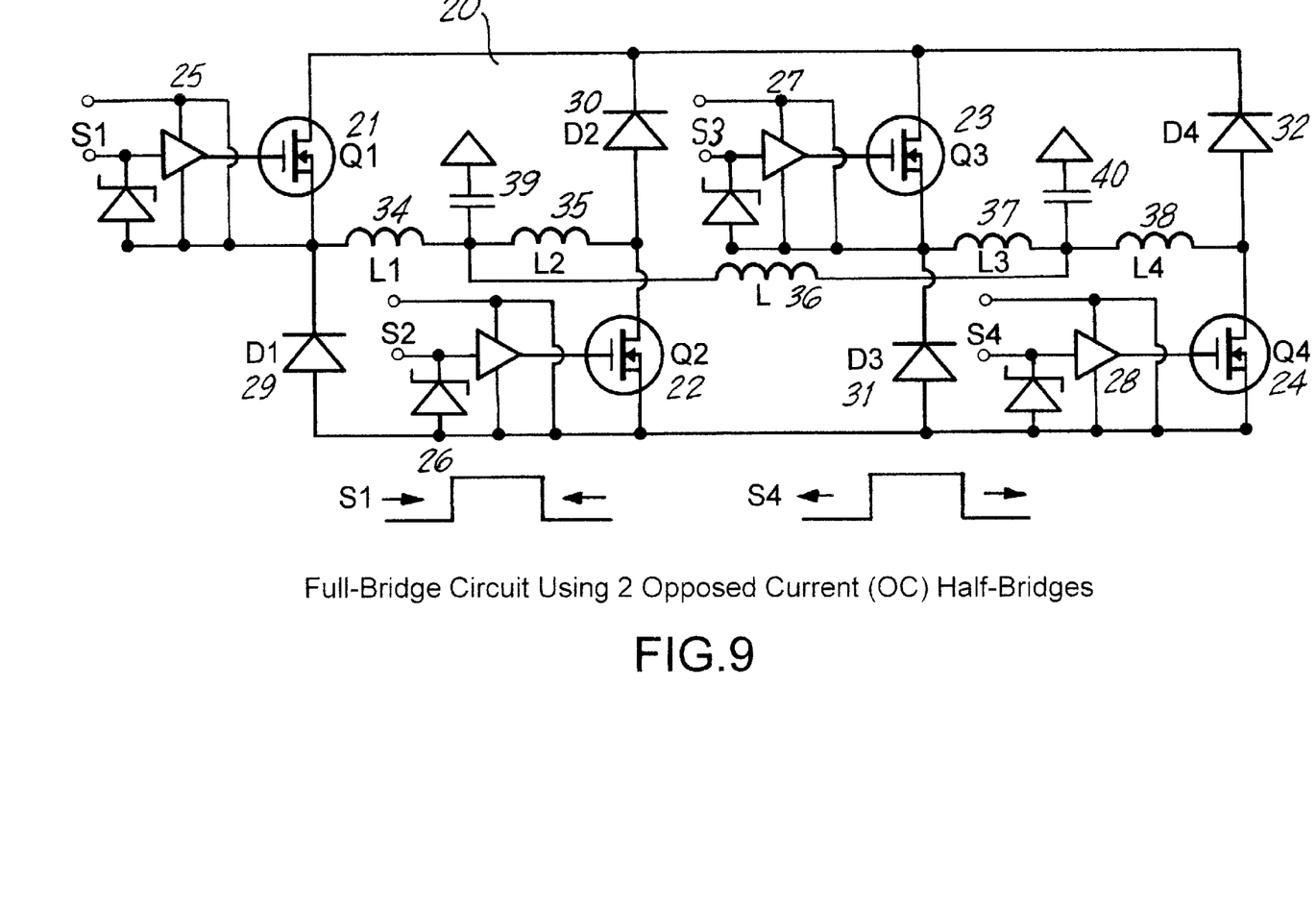
FIG. 9 presents one possible circuit topology for the cryo-silicon inverter/transformer: The Stanley topology (G. Stanley, PESC 1997), also called the Opposed Current Full-Bridge Circuit. Other topologies such as the conventional full-bridge can, of course, also be used.

The circuitry inside the cryo-inverter/transformer box shown in FIG. 6 and FIG. 7 can be implemented by conventional half-, full-bridge, 3-phase-bridge or a "Opposed Current" full bridge topology (Stanley, PESC 1997). The latter is shown in FIG. 9.

Figure 8:
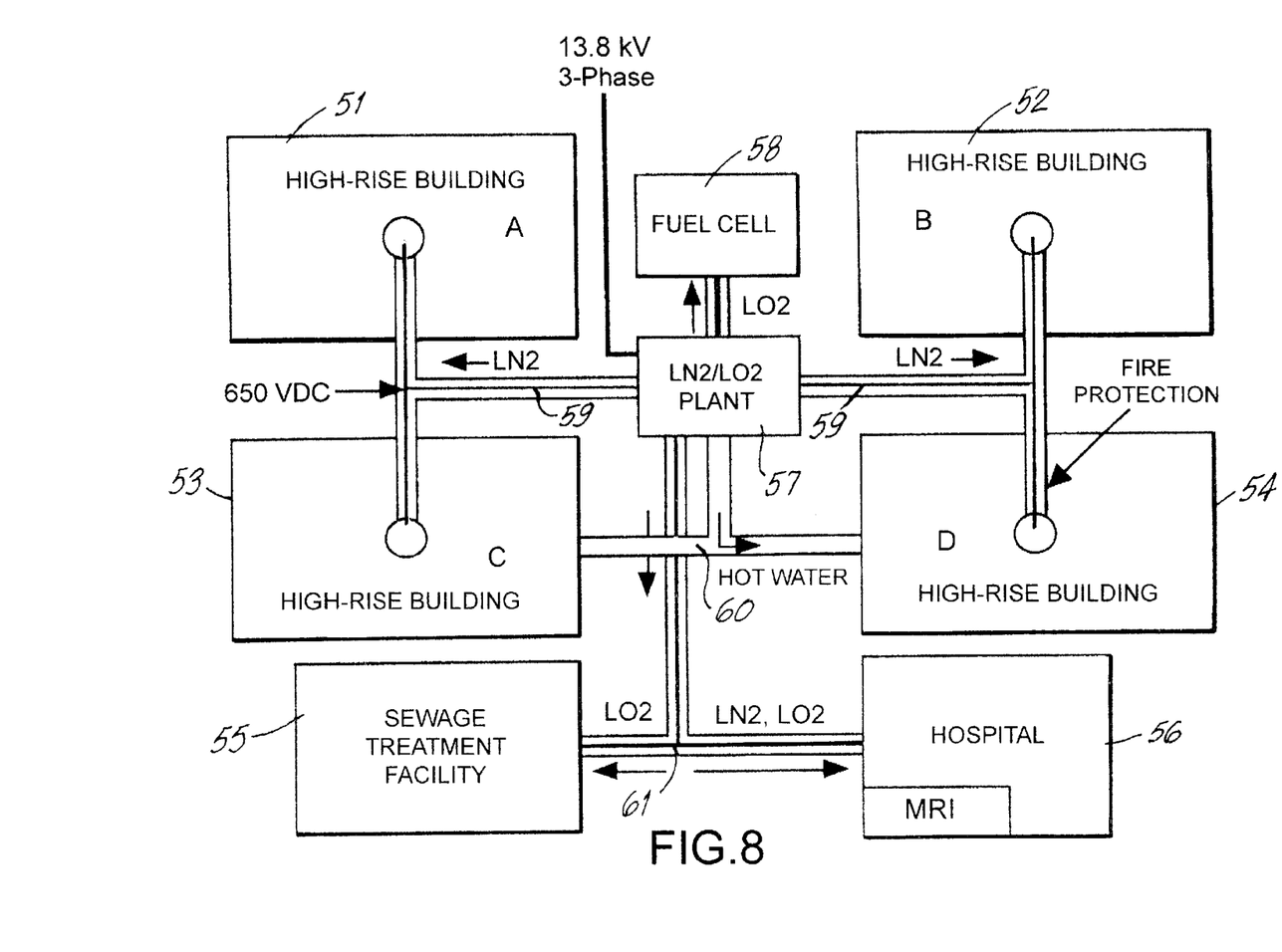
FIG. 8 shows how the cryogenic energy distribution system can advantageously be applied to a set of several large structures such as high-rise buildings in a densely built-up city block. As indicated, an air liquefication plant can be placed in the vicinity of the complex structure providing the required LN2. In addition, the liquefied oxygen obtained simultaneously can be used to feed fuel cells, to provide hospitals or sewage treatment facilities with their required LO2.

It should be obvious that the system according to this invention can also be applied in several high-rise buildings which are close together so that the same cryo-cooling system can be used for all of the buildings: FIG. 8. In this case an air liquefication plant could be placed right into a central location of this city block as shown.

Figure 10:
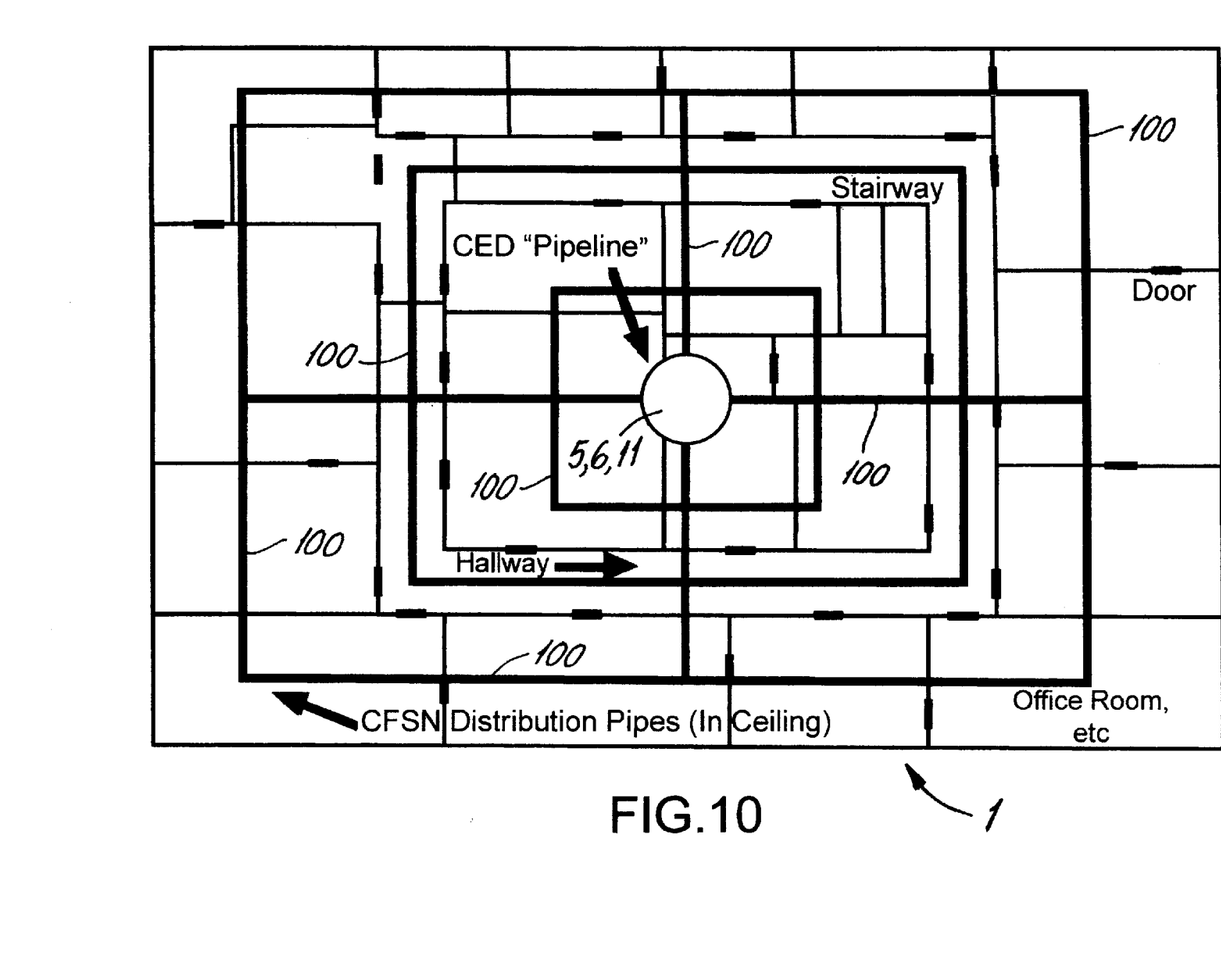
FIG. 10 is a cross-section of a building where the liquid nitrogen available in a structure according to this invention is distributed in different rooms by a pipeline system.
Figure 11:
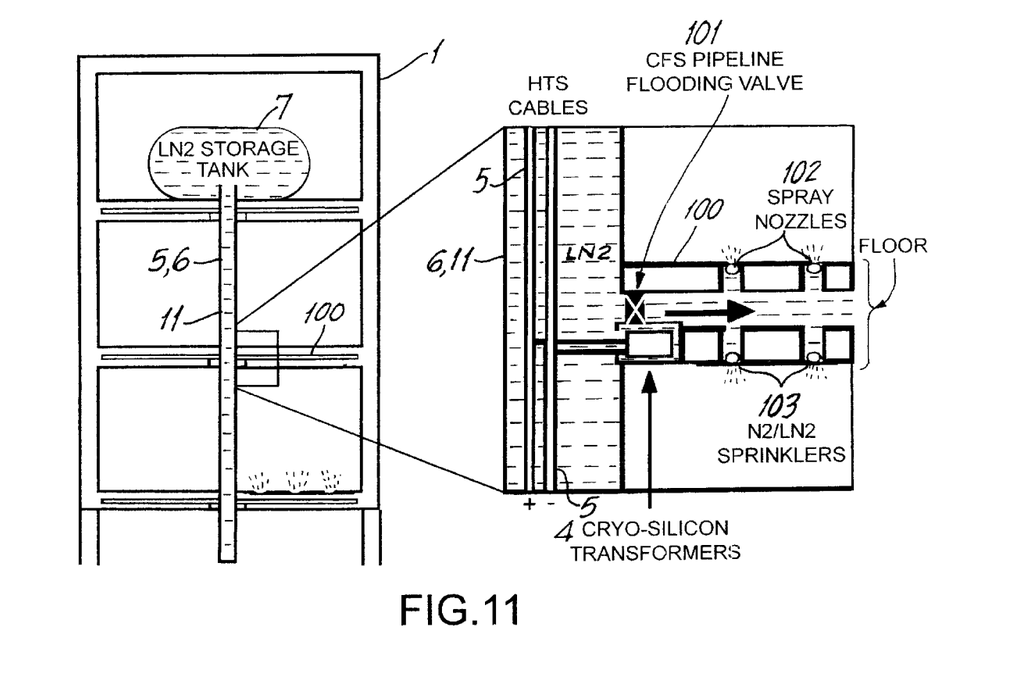
FIGS. 11 & 12 shows several views of the cryogenic fire extinguishing system in a building to be discussed later.
Figure 12:
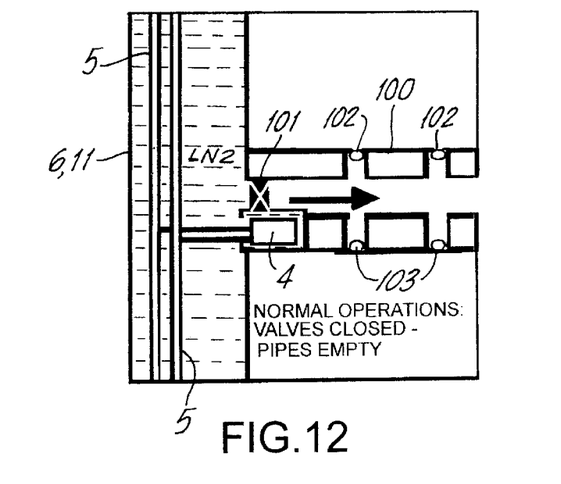

The fire suppression system coordinated with the energy distribution structure is shown in FIGS. 10–12.

Further objects and advantages of my invention will become apparent from a consideration of the drawings and the ensuing description.

BRIEF DESCRIPTION OF THE DRAWINGS

FIG. 4 demonstrates the cryogenic energy/power conversion concept. The key idea is to reduce the losses at the source, the active devices. Then the size and weight can be reduced by the elimination of bulky heatsinks, etc.

FIG. 5 shows one possible implementation of the invention in a high-rise building. It clearly demonstrates the key novelty: The intricate interconnection of a high-temperature superconductor (HTS) cable with a multitude of distributed electronic power conversion circuits acting as DC/AC inverters based on cryo-cooled silicon devices of increased efficiency. The latter replace also conventional, heavy-weight, large-size copper-wire/iron and steel transformers of limited efficiency (94–97%). The acceptable losses of the cable network in such structures is about 2–4%. Thus the use of the lossless HTS cables operated with DC current increases system efficiency by 2–4%. The silicon transformer adds another 3–5% of efficiency gain. Taking into account the necessary air-conditioning load in hot, southern areas the usefulness of this invention should become apparent for implementing energy savings in large cities. It is believed that the energy distribution system shown is unobvious, otherwise it would have been disclosed in another patent.

If the high-rise building drawing is turned by 90 degrees, one could assume it is a ship. Thus the invention applies also to ships and other large structures.

DESCRIPTION OF PREFERRED EMBODIMENTS

This invention discloses a new energy/power distribution system for large structures based on the intricate integration of a high-temperature superconductor (HTS) DC-operated cable with a multitude of widely distributed cryo-cooled DC/AC silicon inverters or cryo-cooled silicon transformers where liquid nitrogen is the preferred cooling fluid. A key element of this invention is the replacement of conventional copper/iron transformers by small solid-state circuits. Therefore, some comments on these transformers are appropriate, especially because they are considered by experts as the "weak links" in the existing system in America.

The efficiency of a typical 75 kVA conventional transformer as used in many buildings at full load is about 95–96%, and its weight is around 500 pounds. The core losses are 400–600 W, the (reactive) magnetization or excitation power 750–2400 VA. The efficiency decreases rapidly at lower load levels due to the required constant magnetization power. This means a conventional transformer uses considerable power even in open circuit operation under no-load conditions. If one multiplies these numbers with the millions of transformers installed worldwide, one obtains quite substantial loss figures. A silicon transformer does not require magnetization power and has zero core losses. Its own losses can be made quite small.

Where conventional transformers in the 30 kVA to 75 kVA range have a full load efficiency of 94 to 96%, a cryo-silicon transformer can operate with an efficiency of >99.8%, not counting the cooling penalty. On a hot summer day in a large southern city (Texas 2000: >100° F. for more than 40 days!!!), the air conditioning system of any high-rise building has to take out all the loss-produced heat generated by the transformers, cables and hundreds of lights, computers, etc. Assuming a COP (Coefficient of Performance) of 2 for the air-conditioning (AC) system, the removal of 2 kW of heat requires 1 kW of AC power. One can prepare the following loss table:

| | |
|---|---|
| Conventional Transformer Loss: | 5% |
| Conventional Cable Loss: | 3% |
| Air-conditioning COP = 2: | 4% ((5% + 3% = 8%)/2 = 4%) |
| Sum: | 12% |

In a 1-megawatt building, this corresponds to a loss of 120 kW just for the distribution and conversion system which, at peak loss load, can basically be eliminated by using the proposed Cryo-Energy Distribution (CED) system. Thus, the CED system uniquely provides 'load shedding' as well as energy savings. The on-site generation of liquid nitrogen called for by the CED system can be carried out in low-load, off-peak hours such as during the night or on weekends. There is no reason why one cannot eventually put an air liquefication plant into a dense city district filled with many high-rise buildings using the CED system. Hospitals in that city require large amounts of liquid oxygen and nitrogen. Liquid nitrogen may also be used for fire protection and fire extinguishing. Liquid oxygen can be used for sewage treatment in that same city: Such a scenario is shown in FIG. 8. It should be obvious that the proposed system would be very beneficial for cities like New York, Boston, Rochester, Dallas, Toronto, Singapore, Tokyo, etc.

It is anticipated that electrical energy savings of 5% to 12% will be achieved, as shown, using the proposed CED system based on the CST. Note that about 1 pound of coal has to be burned in order to generate a single kilowatt-hour of electrical energy. Thus each kWh saved will present an environmental benefit.

One can anticipate the argument that the percentage numbers (5–12%) of electrical energy saved by the CED system are too small to justify this development. But one must also consider the thermal losses in the generator plant contributing to global warming. Assuming that electrical energy is produced in a cogeneration plant with an overall efficiency of 50%, then the actual percentage of total energy (thermal plus electrical) saved as far as global warming is concerned is twice that given above: 2×(5%–12%) =10% to 24%. These numbers are certainly not negligible considering the big cities mushrooming across the globe which could all benefit from the CED system.

The DC losses of the HTS cables are practically zero: There are no AC losses in the 650 VDC cable. AC losses are a real problem in HTS wires. Many papers have been written on this subject of AC losses, even at 60 Hz, in HTS wires. Conventional cabling systems in large buildings burn up many kilowatts of power. A special economic benefit is that this CED system could give the struggling HTS cable industry a big starting boost. It is easier to make and finance the development of a short 650 VDC HTS cable of a few hundred meters than a 100 kV cable of 0.5–20 kilometers in length.

In addition, the replacement of many kilograms of copper and steel with grams of silicon will greatly reduce the overall cost of the system while increasing the free space available. The rental cost in city buildings is high: $200 to $600/m$^2$/year. The replacement of conventional transformers (1.7 m$^2$, 75 kVA) with a cryo-silicon inverter for a lifetime of 50 years would result in cost savings of $10,000 to $30,000 for each transformer replaced due only to the increase in available rental space. This is many times more than the cost of the transformers themselves.

In addition, the cryo-silicon transformer technology can also be applied (with only minor changes) to motor drives, especially in combination with HTS motors. Conventional adjustable speed drives (ASDs) are in many cases larger and more expensive than the motors they operate.

The proposed CED system in a factory can also supply many high-temperature superconducting motors and their corresponding motor drives with power and cooling means.

The CED system can also be expanded to support other functions such as air-conditioning (cooling in hot areas) and fire protection using LN2. FIGS. 10–12 show the fire protection system. The ubiquitous availability of LN2 or, in other words, the fact that the whole high voltage (>120 VAC) electrical power plant is basically immersed in liquid nitrogen will also decrease drastically any danger of electrical fires which have generated many fire disasters. A look at the sky-line of any large city—New York, Albany, Rochester, Buffalo, Boston, Singapore, Hong Kong, Tokyo, Frankfurt—shows that there are many high-rise buildings which can benefit greatly from the CED system. The proposed new technology would be especially suitable for all new high-rise buildings as well as for the rebuilding and renewal of structures in inner cities. The aspects of a successful CED system according to this invention which will give it a clear competitive advantage in the marketplace are summarized in the following Table 1.

TABLE 1

Advantages of the CED System

•The CED system combines Cryo-Silicon Transformers with HTS cables.
•460 VAC, 3-Phase System Replaced by 650 VDC: Doubling of Power Handling Capability.
•DC Operation: No HTS AC-Losses! (Very important! AC losses in HTS cables are a real problem!)
•Low-Weight Silicon Transformer Replaces Heavy-Weight Iron-Core Transformer.
•At 75 kVA: Weight Reduction: 250 kg to about 5–10 kg (factor of 25–50)
•Improvement in Power Density: 0.3 kVA/kg to 15 kVA/kg
•At 75 kVA: Size Reduction: 0.17 kVA/liter to 10–20 kVA/liter.
•Cost reduction: "Silicon is cheap"!
•Cooling Problem Solved by HTS Cryo-Pipe Distribution Cable
•Single LN2 Storage Tank Only Needed for Multiple Transformer Units (5–100)

TABLE 1-continued

Advantages of the CED System

- Additional Uses: Air-Conditioning (Cooling), Fire Protection, Fire Extinction
- No Exploding Oil-Transformers! Inherent Safety due to LN2.
- DC-HTS 650 VDC Cable: Only Short Lengths Needed
- CED System Suitable for all Large Buildings, for Ships, Airplanes, etc.
- HTS Wires with Reduced Specifications for CED.
- No Magnetization Power Required: Energy Savings
- Excellent Power Factor Correction due to DC Operation:
- Solution to Power Quality Problems
- Voltage Regulation Possible
- UPS System using Capacitive Energy Storage can be Added.
- Built-In Power Load Shedding Capability due to LN2-Cooling.
- Extension to Higher Voltages (1–10 kV) Possible.

A Cryo-Silicon Transformer/Inverter can be designed using a suitable circuit topology such as that shown in FIG. 9. Of course, conventional circuit topologies such as a full-bridge or 3 half-bridges can also be used for the silicon transformer. The proposed preliminary specifications are summarized in the Table 2.

Important components in all power circuits are the commutating diodes necessary for inductive loads. In order to reduce losses even more, one may also use Cryo-Germanium diodes.

The main purposes and advantages of the Cryogenic Energy Distribution (CED) system are threefold:

The large-scale implementation of the invention in big cities will provide much higher power transmission and conversion efficiency compared to the existing hundred year old system thus saving a considerable amount of expensive energy and reducing global warming. It combines high-temperature superconductors (HTS) with low temperature operated silicon devices.

This invention replaces conventional heavy-weight cooper and steel transformers by small cryo-silicon inverters thus providing-a considerable reduction in expensive building space and replacing kilograms of copper and iron with milligrams of silicon.

This invention applies the advantages of the cryo-semiconductor technology such as size, weight, and cost reduction at increased reliability to the field of power conversion.

TABLE 2

SPECIFICATIONS

| | |
|---|---|
| Voltage Ratio: | 650 VDC–120/240 VAC |
| Phases: | Single Phase (FIG. 8 Topology) or 3-Phase (TBD) |
| Power Level: | 50–75 kVA (TBD) |
| Efficiency: | >99.7% (without cooling penalty) |
| Frequency: | 50–60 Hz |
| Switching Frequency: | 1000–10,000 Hz (TBD) |
| Devices: | Cryo-MOSFETs, Cryo-Multi-chip Modules (CMCM), if available from other contract or discrete devices. |
| Volume: | 3–10 liters |
| Weight: | 10–30 kg |
| Special Features: | Improved power quality, voltage regulation, load shedding, and power factor correction due to DC isolation. |
| Dewar: | A circuit dewar with low thermal losses will be designed. |

Key features of this invention are shown in FIG. 5. A high-rise building 1 with many (5–100) floors receives its power from a 13 kV/480 V AC line transformer 3 feeding a rectifier 2 which can be implemented with diodes or synchronous MOSFET rectifiers (circuitry not shown because it is well-known). A high-temperature superconductor cable 5 is placed from the top to the bottom of the building into a conduit 6 and may be connected to a liquid nitrogen tank 7 on the top of the building. The tank 7 could also be connected to a cryo-cooler which is not shown. The evaporated LN2 can in a closed system be collected by the conduit 6 and again liquified by a cryo-cooler. The conduit 6 would then provide "vapor cooling" for the HTS cable.

On each floor one or more cryo-silicon DC/AC inverters/transformers 4 are connected to the HTS cable/conduit 5, 6 which provides power as well as the required cooling fluid. Inverters/transformers 4 convert a DC voltage of 2×325 or 650 VDC into a 60 Hz 120/240 VAC voltage. Whereas inverters/transformers 4 are kept at a temperature of 77 K their output terminals supplying 120 VAC, 60 Hz, are at room temperature (300 K). These output terminals at room temperature then provide electricity to the conventional low-power 120 VAC users 8 such as computers, coffee machines, printers, lights, etc.

If the structure shown in FIG. 5 is turned by 90 degrees then the same system would apply to a horizontal factory building or a large ship. In summary, it is believed that the key feature of this invention of a new energy/power distribution system for large structures is based on the intricate integration of a high-temperature superconductor (HTS) DC-operated cables with a multitude of widely distributed cryo-cooled DC/AC silicon inverters or cryo-cooled silicon transformers 4 where liquid nitrogen is the preferred cooling fluid. Of course, other cooling fluids such as carbon-fluorids, e.g. C8F8, could also be used.

The HTS cable 5 needed for the proposed system can be made with today's technology of HTS BSCCO PIT-wires (PIT=Powder in Tubes). Several companies are working on such cables. In these HTS wires the BSCCO ceramic HTS material is embedded in silver, which makes them relatively expensive. But the nice feat ire of this invention is that only relatively short pieces of cable are required. In most cases not more than a few hundred meters. It is believed that the extra cost of the HTS cable is offset after a short time by the energy savings provided. One has to take into account that the energy savings of the new system if integrated over a lifetime of 50–100 years will be considerable. As mentioned before, the invention provides the high-temperature superconductor industry with the opportunity to have a market for their product without going through the high investment costs of high-voltage (>100 kV), long length (>0.1 km) cables. But regardless of the availability of HTS cables, this invention can also be implemented with cryo-cooled, high-purity copper or aluminum cables. The DC resistance of copper at 77 K (LN2) is about a factor 7 smaller than at 300 K. (This factor is much higher in more expensive very pure copper.) This corresponds approximately to the cooling penalty of generating liquid nitrogen which is about 6W/W. Therefore, the load shedding capability of liquid nitrogen is provided also in the case of cryo-cooled copper cables. In such a system, one could, of course, also work with a cooling fluid other than LN2 which has a higher temperature somewhere between 77 and 250 K. In this case, of course, the advantage of potentially using HTS components such as HTS coils in the power electronics is lost. Investors may prefer to pay for the silver in a HTS cable if it is located in their own building and not somewhere under a street.

FIG. 6 shows that HTS cable 5 is shielded by multi-layer insulation (MLI) 11 for minimization of the thermal losses. It also is indicated that a preferred voltage is 650 VDC obtained by rectifying 480 VAC. Of course, the input voltage could also be a fuel cell replacing conventional wire transformer 3. A key component of the invention is the T-section 10 shown in FIG. 6. It provides the inverter 4 placed inside a dewar 9 with electrical power as well as with the cooling fluid, preferably LN2 supplied by tank 7. Using multi-chip modules based on the high-density interconnect (HDI) technology one can also design a T-section where the cryo-inverter is integrated with a part of the HTS cable using flex-circuitry and thus bringing miniaturization technology to the field of power distribution.

FIG. 7 compares a conventional 75 kVA copper/iron transformer with the cryo-MOSFET inverter according to this invention. It illustrates the improvements possible in power and weight density by this innovation. This figure also indicates that the cryo-inverter can be so small that it could be placed inside the floor or a wall of a building saving valuable space.

A key component of the disclosed novel cryogenic energy distribution (CED) system besides the HTS cable is the cryo-silicon DC/AC inverter/transformer. FIG. 9 shows one of several possible circuit topologies, the so-called Stanley-Topology (10), which can be used to implement these inverters. The circuitry if implemented in the topology of FIG. 9 consists of transistors, preferably MOSFETs, Cool-MOSFETs (3–5), 21–24, or IGBTs (Insulated Gate Bipolar Transistors) controlled by control drive circuits 25–28 and operated with pulse-width modulation (PWM). Commutating diodes 29–32 may be implemented with cryo-silicon or cryo-germanium devices, perhaps to be developed by a NASA SBIR Phase II program if approved. The latter (Ge-diodes) have much lower on-state voltage. Inductors 34–38 could be implemented with high-temperature superconductors made in thin-film or in surface coated technology. Together with capacitors 39 and 40 they form a filter for the elimination of the pulse-width modulation frequency. Inductor 36 constitutes the load. The MOSFETs 21–24 and diodes 29–32 can be implemented in the form of cryo-multi-chip modules providing miniaturization. This cryo-cooled (77K) inverter circuitry can have an electronic efficiency (without cooling penalty) of >99.7%. This compares well to the 95–96% efficiency of conventional copper/iron transformers. This circuit can also be implemented with high-density interconnect (HDI) technology for miniaturization (11–13).

The cryogenic energy distribution (CED) system of this invention is, of course, in no way limited to a single building structure. It can be applied to a whole set of buildings as shown in FIG. 8, where 5 structures are shown. Many energy efficient and environmentally beneficial features are obtained by its application. FIG. 8 shows four high-rise buildings 51–54 supplied by electrical power and liquid nitrogen via HTS cables 59 from a central power plant 57 which supplies the DC voltage (for example 650 DC) and contains also an air liquefication apparatus. The power could also be delivered from a fuel cell 58 supplied with oxygen from the liquefication apparatus. Fuel cell 58 and air liquefication plant 57 both generate heat which can be used to provide hot water via pipe 60 to the buildings 51–56. Building 56 is shown as a hospital having one or more MRI (Magnetic Resonance Imaging) machines. All hospitals need large quantities of liquid oxygen and liquid nitrogen supplied by piping system 61. Big cities require also a large-scale sewage treatment facility 55. Liquid oxygen is also being used by such a sewage treatment plant 55 and is supplied by pipe 61.

Fire Protection, Suppression and Extinction:

The availability of liquid nitrogen in a building where the CED system has been implemented provides a unique new feature not seen elsewhere: LN2 can be employed in a dual use fashion for fire suppression. Fires in high-rise buildings can be very disastrous.

Just a few years ago the fire extinguishing power of liquid nitrogen was proven beyond any doubt in fighting some of history's greatest fires: The burning oil wells of Kuwait in 1991. The 'Red Flame Oil Well Fire & Blowout Specialists' were the first to bring a burning well under control by the innovative technique of freezing the head with liquid nitrogen. "Popular Science" of September 1991 (pp. 62–65) has dedicated an article to this innovative fire extinguishing technique entitled "Fire over Kuwait: In the Kuwaiti desert, 'hellfighters' from Houston are snuffing out oil well fires with water, liquid nitrogen, and elbow grease".

In most cases liquid nitrogen (LN2) can fulfill the requirement that the suppressants 'will not harm the environment nor cause excessive collateral damage to a structure or its contents' (DOC SBIR, 98-1, p.96). LN2 also provides low or zero toxicity. The means for storage and delivery are automatically given in a dual-use fashion by the proposed CED system across the whole building. It enables 'timely and precise delivery to the space being protected' as well as 'enhanced interaction of the agent with the fire and minimal negative interaction with the surroundings'. Methods of overcoming the deficiencies of possible asphyxiation by the inert gas of nitrogen and frost-burns from contact with liquid nitrogen can be implemented and designed into the system.

Another great advantage of the proposed LN2 Cryo-Fire-Protection (CFP) scheme in comparison to halocarbon based chemicals and their substitutes is that no 'negative impacts on stratospheric ozone depletion or global warming' exist. There are no problems with 'atmospheric lifetimes' and a zero ozone-depletion potential (ODP) is inherently given.

FIG. 10 illustrates a possible liquid nitrogen or nitrogen gas distribution system in one floor of a high-rise building. One can envision two types of pipes: One for LN2, which is the same as the HTS cable 5, and the other for nitrogen gas only: Low-cost pipes 100. The cable 5 requires high thermal insulation 11, whereas the other pipes 100 can consist of low-cost plastic tubing ($ 0.95 for 10 feet long, 0.5", plastic pipe).

FIG. 11 shows a vertical cross-section of the building 1. The proposed system drawing is self-explanatory. Under normal operating stand-by conditions only the main vertical central tube 5, 6, 11 is filled with LN2. A CFS Pipeline-flooding solenoid valve 101 would be automatically opened in the case of a fire. Since the distribution tubes are at room temperature the liquid nitrogen will be evaporated and enter the fire room as inert gas which may still carry LN2 droplets. As illustrated in FIGS. 11 and 12 the fire extinguishing suppressant (N2) can be delivered to a single floor from both the ceiling and the floorboards of that floor. This is an advantage compared to conventional water sprinkler systems. One should note the small size of the cryo-silicon transformer 4 which will convert the 325/650 VDC into 120 VAC, 60 Hz, power. It can be mounted into the floor or wall, thereby saving valuable and expensive office space. The power levels will generally be in the range of 25 to 75 kVA. It is important to note that the CFS System is designed to save buildings and structures once all people have been safely evacuated.

FIG. 11 shows on the left the high-rise building 1 with LN2 storage tank 7 connected to the high-temperature superconducting cable 5, supplying power as well as cooling fluid LN2. The right side indicates how the main cable 5 is connected via a flooding valve 101 to a CFS pipeline 100. The latter has spray nozzles 102 to the floor or nitrogen gas/liquid nitrogen (LN2/N2) sprinklers 103 to the ceiling of the lower floor.

FIG. 12 shows the CFS system in the normal mode of operation where valve 101 is closed and the distribution pipes 100 are empty with nozzles 102 and sprinklers 103 also closed. The pipes 100 can supply liquid nitrogen or also just nitrogen gas to the far end of the system.

What is claimed is:

1. An electrical power conversion and distribution system for delivering electrical power from a source to a plurality of end users of said power, comprising:

a primary cable receiving said power from said source;

a plurality of secondary cables, each said secondary cable being connected at a first end of said secondary cable to said primary cable for carrying a respective portion of said power to a respective one of said plurality of end users;

a plurality of first conversion units, each first conversion unit being connected to a second end of a respective secondary cable to convert said power portion of said associated secondary cable, said power portion after being converted having electrical characteristics necessary for power usage by said end users respectively;

said primary cable, said secondary cables, and said first conversion units being fabricated of materials and components having improved performance efficiency when operating at temperatures below ambient temperature, and further comprising:

a refrigeration system in heat exchange relationship with and maintaining said cables and said first conversion units below ambient temperature for efficient operation;

wherein said primary cable is housed in a primary cooling supply tube, said primary cable being submerged in said primary supply tube in a cooling fluid at said below ambient temperature, said secondary cables being enclosed in secondary cooling supply tubes filled with said below ambient temperature cooling fluid, said refrigeration system providing said cooling fluid to said primary and secondary supply tubes.

2. An electrical power conversion and distribution system as in claim 1, wherein said first conversion units are within one of walls and floors adjacent to said end users respectively.

3. An electrical power conversion and distribution system as in claim 1, wherein said first conversion units include superconducting buss bars, superconducting filters, and superconducting inductors for size reduction.

4. An electrical power conversion and distribution system as in claim 1, wherein said cooling fluid is one of liquid nitrogen, an inert liquefied gas, and a mixed gas refrigerant.

5. An electrical power conversion and distribution system as in claim 1, wherein said primary and secondary cables are one of superconducting material, high purity copper, and high purity aluminum, said below ambient temperature being cryogenic, and said first conversion units including solid state semiconductor devices operating cryogenically and having at least one of an inductor, resistor, and capacitor operating cryogenically.

6. An electrical power conversion and distribution system as in claim 5, wherein said primary cable is input with DC voltage, said secondary cables receiving said DC voltage from said primary cable, and said first conversion units changing said DC to AC at predetermined voltages and frequencies for use by said end users.

7. An electrical power conversion and distribution system as in claim 5, wherein said inductor required for said first conversion units is made using a high temperature superconductor.

8. An electrical power conversion and distribution system as in claim 7, wherein said first conversion units are made with cobalt-alloy core materials exhibiting an increase in permeability at cryogenic temperatures.

9. An electrical power conversion and distribution system as in claim 1, wherein said conversion units are mounted on printed circuit boards, each conversion unit being housed in a respective sealed thermally insulated container, each said conversion unit having an input terminal connected to said second end of the associated secondary cable at cryogenic temperature and having an outlet terminal near ambient temperature.

10. An electrical power conversion and distribution system as in claim 1, wherein said first conversion units are inside said secondary supply tubes of said secondary cables respectively.

11. An electrical power conversion and distribution system as in claim 1, wherein said primary cable is input with DC voltage, said secondary cables receiving said DC voltage from said primary cable, and said first conversion units changing said DC to AC at predetermined voltages and frequencies for use by said end users.

12. An electrical power conversion and distribution system as in claim 11, wherein said power source is AC and AC to DC conversion is carried out with synchronous rectification in a second conversion unit using cryo-MOSFETs in a circuit topology including at least one of half-bridge, full-bridge, and multi-purpose bridge configurations to provide said primary cable with said DC voltage.

13. An electrical power conversion and distribution system as in claim 1, and further comprising:

a plurality of flow nozzles, said flow nozzles being mounted in walls of said secondary cooling supply tubes for flow of said cooling fluid from within said secondary cooling supply tubes through said nozzles into surrounding spaces, and control means for opening and closing said nozzle flow in response to the presence and absence of a fire condition in said surrounding spaces, said cooling fluid being gaseous above ambient temperature and not supporting combustion.

14. An electrical power conversion and distribution system as in claim 1, wherein said primary and secondary supply tubes are thermally insulated from ambient spaces, at least one of said ambient spaces being cooled by heat entering said supply tubes from said one ambient space, said insulation being specifically selected to provide a below-ambient temperature and thereby an air conditioning function locally in said one ambient space.

15. An electrical power conversion and distribution system as in claim 1, said refrigeration system including a storage vessel containing a supply of said cooling fluid, said storage vessel being flow connected to said primary supply tube.

16. An electrical power conversion and distribution system as in claim 1, where said primary cable is of extended length and at least a portion of said plurality of secondary cables respectively connect to said primary cable at different locations.

17. An electrical power conversion and distribution system for delivering electrical power from an AC source to a plurality of end users of said power, comprising:

a superconducting primary cable of extended length receiving said power from said AC source after conversion from AC to DC;

a plurality of superconducting secondary cables, each said secondary cable being connected at a first end of said secondary cable to said primary cable for carrying a respective portion of said converted power to a respective one of said plurality of end users, at least a portion of said plurality of secondary cables respectively connecting to said primary cable at different locations;

a plurality of DC to AC conversion units, each DC to AC conversion unit being connected to a second end of a respective secondary cable to reconvert said respective portion of said converted power of said associated secondary cable, said reconverted portion having AC voltage and frequency characteristics necessary for power usage by said end users respectively, said DC to AC conversion units having integrated semiconductor construction and operating cryogenically;

said primary cable being housed in a primary cooling supply tube, said cable being submerged in said supply tube in a liquid nitrogen cooling fluid at cryogenic temperature, said secondary cables being enclosed in secondary supply tubes filled with said liquid nitrogen cooling fluid;

a refrigeration system providing said liquid nitrogen cooling fluid to said primary and secondary supply tubes by way of a storage vessel holding liquid nitrogen and flow-connected to said primary supply tube.

18. An electrical power conversion and distribution system as in claim 17, wherein said AC to DC conversion is carried out with integrated semiconductor transformer and rectifier constructions operating cryogenically.

19. An electrical power conversion and distribution system as in claim 17, wherein an interior volume of said primary supply tube is in direct communication with an interior volume of each said secondary supply tube at a respective connection point between said primary supply tube and each said secondary supply tubes, said liquid nitrogen filling said secondary supply tubes by way of said primary supply tube.

* * * * *